June 25, 1946.  E. A. WILCKENS  2,402,860
METHOD AND APPARATUS FOR HANDLING AND TREATING STRIP MATERIAL
Filed Aug. 14, 1940  13 Sheets-Sheet 1

June 25, 1946. E. A. WILCKENS 2,402,860
METHOD AND APPARATUS FOR HANDLING AND TREATING STRIP MATERIAL
Filed Aug. 14, 1940 13 Sheets-Sheet 4

Inventor
Fibe A. Wilckens
Attorneys

June 25, 1946. E. A. WILCKENS 2,402,860
METHOD AND APPARATUS FOR HANDLING AND TREATING STRIP MATERIAL
Filed Aug. 14, 1940 13 Sheets-Sheet 7

June 25, 1946. E. A. WILCKENS 2,402,860
METHOD AND APPARATUS FOR HANDLING AND TREATING STRIP MATERIAL
Filed Aug. 14, 1940 13 Sheets-Sheet 9

Patented June 25, 1946

2,402,860

UNITED STATES PATENT OFFICE 2,402,860

METHOD AND APPARATUS FOR HANDLING AND TREATING STRIP MATERIAL

Elbe A. Wilckens, Baltimore, Md., assignor to Crown Cork & Seal Company, Inc., Baltimore, Md., a corporation of New York Application August 14, 1940, Serial No. 352,645

18 Claims. (Cl. 117—103)

This invention relates to method and apparatus for handling and treating strip material and in particular contemplates method and apparatus whereby strip material, continuously unwound from a roll, may be simultaneously coated on both faces, may be dried by simultaneous action on both faces, may, if required, be cooled, and may be continuously rewound. For the accomplishment of these operations the invention includes coating mechanism adapted to apply the same or different colors to the two faces of a strip, and includes subsequently effective handling mechanism whereby the coated strip is supported, preferably entirely from its edges, in transversely bowed relation and caused to travel through a drying oven wherein a heated drying medium is directed to the faces of the strip, both faces being exposed. In cases where cooling of the dried strip becomes necessary or desirable, the invention contemplates a cooling tank across the top of which the strip may be led in flat relation, means being provided whereby the tank-traversing portion of the strip may be depressed from flat relation into a loop extending downwardly into a cooling medium in the tank.

In the accompanying drawings I have shown practical apparatus for accomplishing the purposes of the invention and the description will proceed with reference to these drawings, in which.

Figure 1:
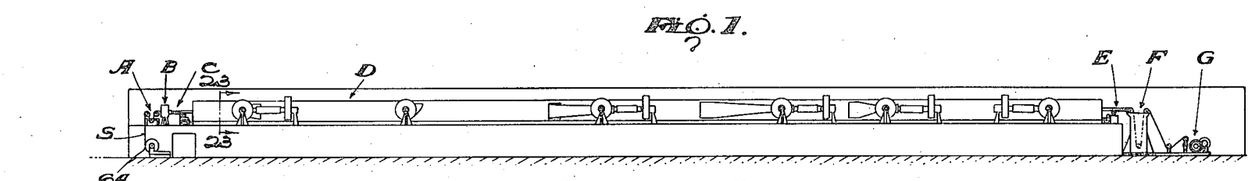
Figure 1 is a side elevation of a complete line in accordance with the invention.
Figure 2:
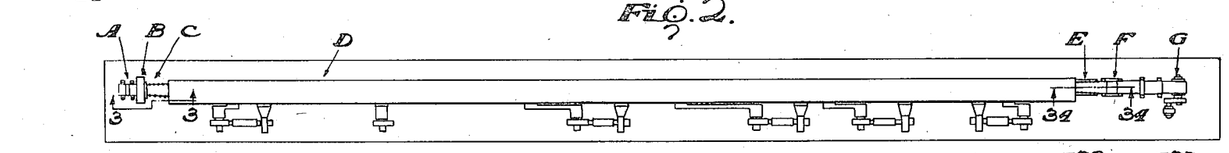
Figure 2 is a plan view of the apparatus of Figure 1.

Referring to the drawings, and particularly to Figures 1 and 2 for a general view of the component parts of the line, A designates strip handling mechanism in advance of coating mechanism B, C represents mechanism for imparting a transversely bowed condition to the strip at the entering end of an oven D. E represents mechanism permitting the return of the bowed strip to flat condition, F represents cooling apparatus, and G rewind mechanism.

Figures 31, 32, 33:
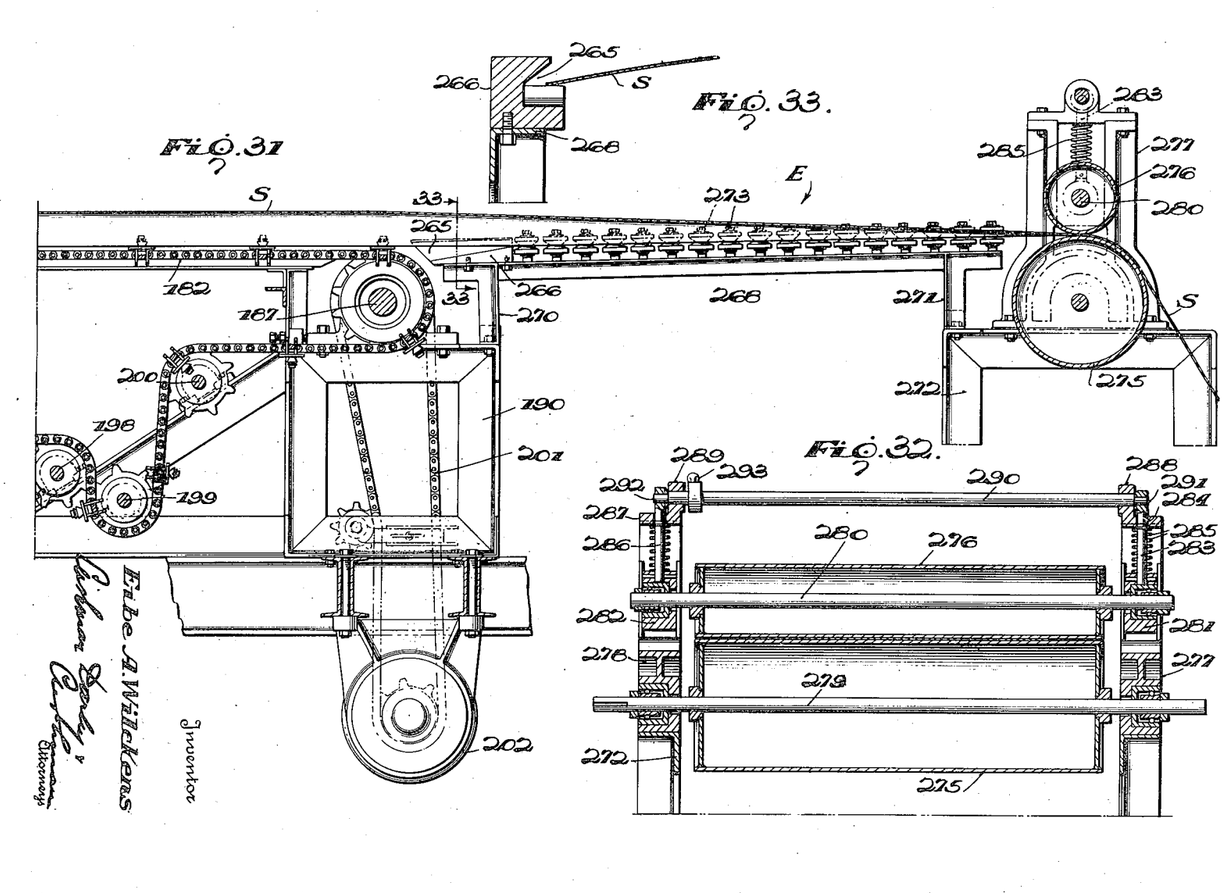
Figure 31 is a section on line 31—31 of Figure 29.
Figure 32 is a section on line 32—32 of Figure 29.
Figure 33 is a section on line 33—33 of Figure 31.
Figures 34, 35, 36:
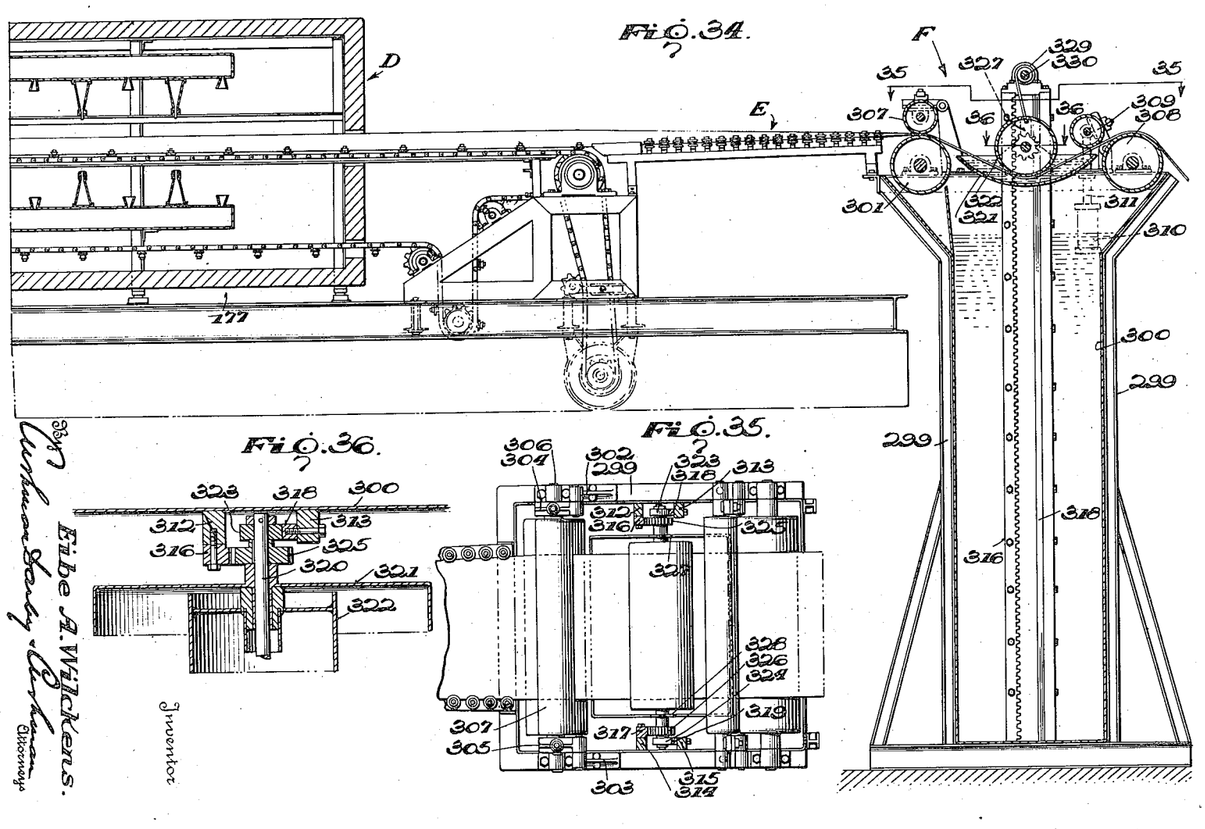
Figure 34 is a section on line 34—34 of Figure 2.
Figure 35 is a section on line 35—35 of Figure 34.
Figure 36 is a section on line 36—36 of Figure 34.
Figures 38, 39:
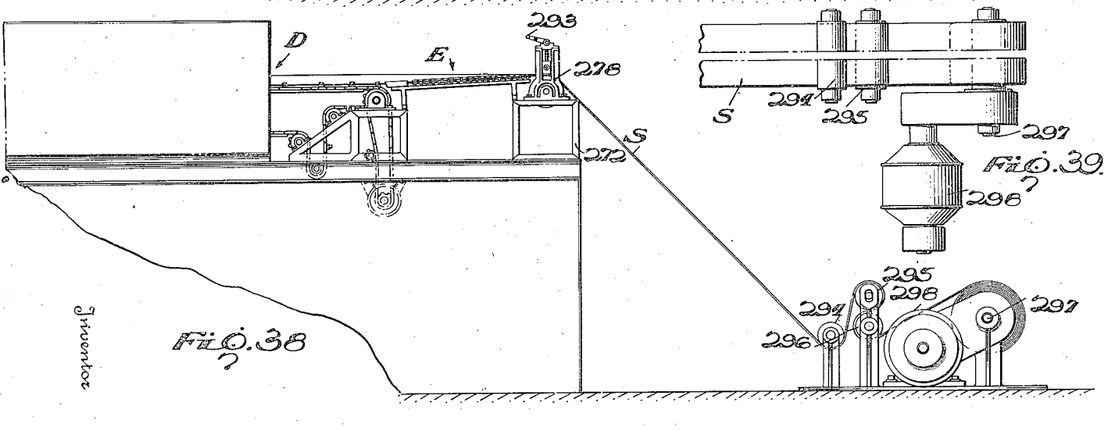
Figure 38 is a side elevation showing the apparatus of Figure 31 in association with rewind mechanism.
Figure 39 is a plan view of the rewind mechanism.

Referring also to Figures 3 to 6, reference numeral 50 designates a frame which at its left hand end supports a pair of pedestals 51 and 52 in the lower portions of which is journaled a shaft 53 on which is fixed a roll 54. A roll 55 above roll 54 is journaled in vertically slidable channels in the pedestals and is normally springpressed toward roll 54. This particular roll arrangement is utilizable also at the opposite end of the line as shown in Figures 31, 32 and 38 and will be described later on in more detail with reference to these latter figures.

Adjacent the right hand end of frame 50, a shaft 56 is journaled in bearings 57 and 58, and has fixed thereon a cylindrical roll 59 which has clamped thereto, in properly spaced relation, axially adjustable flanges 60 and 61 which have opposed conical faces 62 and 63 spreading from radial base portions. A strip S of flexible material, for example thin metal as used in the manufacture of container closures such as crown lug, screw, and the like caps, is led from a suitably journaled roll 64, Figure 1, upwardly and between rolls 54 and 55, where a flattening action is exerted, and thence through a depending loop and over roll 59. Rolls 54 and 59 are driven at like peripheral speed by any suitable means so that the intermediate loop is maintained, this permitting the strip to be squarely positioned between the radial base portions of the flanges 60 and 61, Figure 6, by the conical portions of the latter.

Referring particularly to Figures 3 and 7 to 10, the coating mechanism B comprises a frame 65 having opposite parallel side walls 66 and 67. Formed in side wall 66 are inclined rectilinear slots 68 and 69 which are equally divergent rearwardly from the horizontal. Wall 67 has formed therein slots 70 and 71 parallel to slots 68 and 69 respectively. These slots have slidable therein blocks as at 72 and 73, Figure 7, in which are journaled the ends of shafts 74 and 75 to which are fixed applicator rolls 76 and 77. The bearing blocks are yieldingly urged outwardly by springs as at 78 and 79 set in pockets at the inner ends of the guide slots.

Slots 69 and 71 are outwardly closed by cap plates 80 and 81 in which are threaded the shanks of stops 82 and 83. The ends of slots 68 and 70 are closed by cap plates 84 and 85 from which project rigid arms 86 and 87.

Fixed on shafts 74 and 75 outwardly of wall 67 are gears 88 and 89 which intermesh in the illustrated normal position of the rolls 76 and 77. Wall 66 is provided with a horizontal slot 90 to the rear of and midway between shafts 74 and 75, this slot slidably receiving the spacer piece 91 of a slide 92 which includes outer and inner plates 93 and 94 slidable on the outer and inner surfaces of the wall. Plate 93 supports perpendicularly thereto stub shafts 95 and 96 on which are rotatable intermeshed gears 97 and 98 which respectively engage gears 88 and 89, this engaging relation being maintained by links 99 and 100 which respectively connect stub shaft 95 and roll shaft 74 and stub shaft 96 and roll shaft 75. A stop 101 cooperates with the slide 92. A slide 102 similar to slide 92 is similarly mounted on side wall 67 and carries stub shafts (not shown) like 95 and 96 similarly connected by links (not shown) like 99 and 100 with the other ends of roll shafts 74 and 75. A stop 103 cooperates with slide 102. Shafts 104 and 105 have their ends journaled in the inner plates of the two slides and carry idler rolls 106 and 107 which engage the strip S just in advance of the applicator rolls.

Supply rolls 108 and 109 have intermeshing gears 110 and 111, the latter meshing with gear 88. Roll 108 dips in a coating supply tray 112 whose rear end is pivoted to the slides on upstanding links as at 113, Figure 9, and whose forward portion has fixed therebeneath a bar 114 engageable in top and bottom notches in brackets 115 and 116 so that the pan is supportable in the full line position shown in Figure 9, wherein it is in feeding relation to roll 108, or in the dotted line tilted drainage position, reference numeral 117 designating a drain spout. Lower supply rolls 118 and 119 are geared together by gears 120 and 121, the latter normally meshing with gear 89. Roll 118 dips in a pan 122 supportable by rods 123 and 124 in the operative position shown in full lines in Figure 9, or in the dotted line drainage position. Reference numeral 125 designates a drip pan supported on brackets on the frame side walls.

Reference numeral 126 designates a power input shaft, driven from any suitable source, journaled on the lower portion of frame 65. A sprocket 127 fixed on shaft 126 is connected by a chain 128 with a sprocket 129 fixed to a gear 130 journaled in a block 131 on the outside of side wall 67. Gear 130 meshes with a gear 132 journaled in the same block 131, this gear meshing with a gear 132' similar to the gear 89, fixed on the opposite end of shaft 75 from the latter. The axis of gear 132 is in a plane which includes the axis of shaft 75 and is normal to the line of slots 69 and 71 in which the bearings for shaft 75 are slidable.

Figure 7:
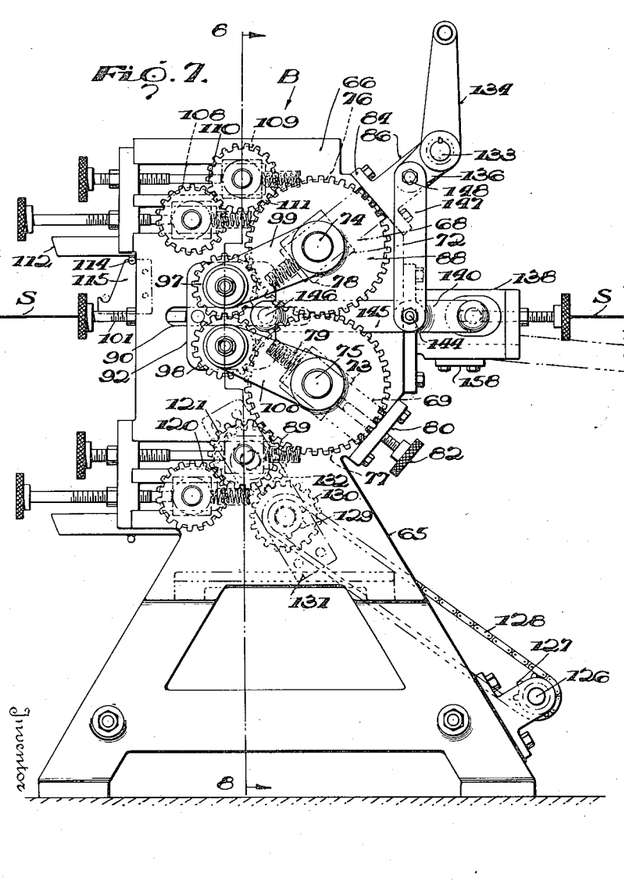
Figure 7 is a side elevation, on enlarged scale, of coating mechanism which appears adjacent the head end of the line in Figures 1 and 2.
Figure 9:
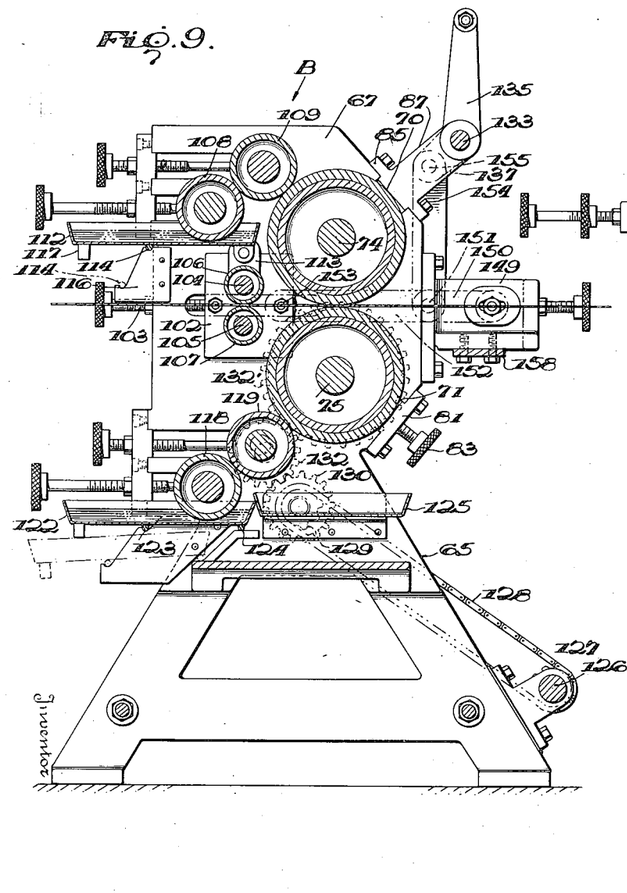
Figure 9 is a vertical trans-axial section of the apparatus of Figure 7.
Figure 10:
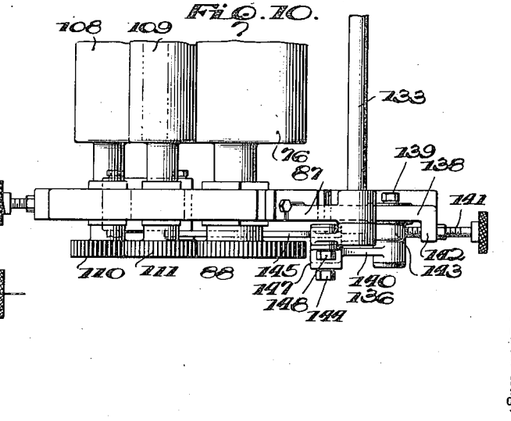
Figure 10 is a partial plan view of the apparatus of Figure 7.
Figures 11, 12:
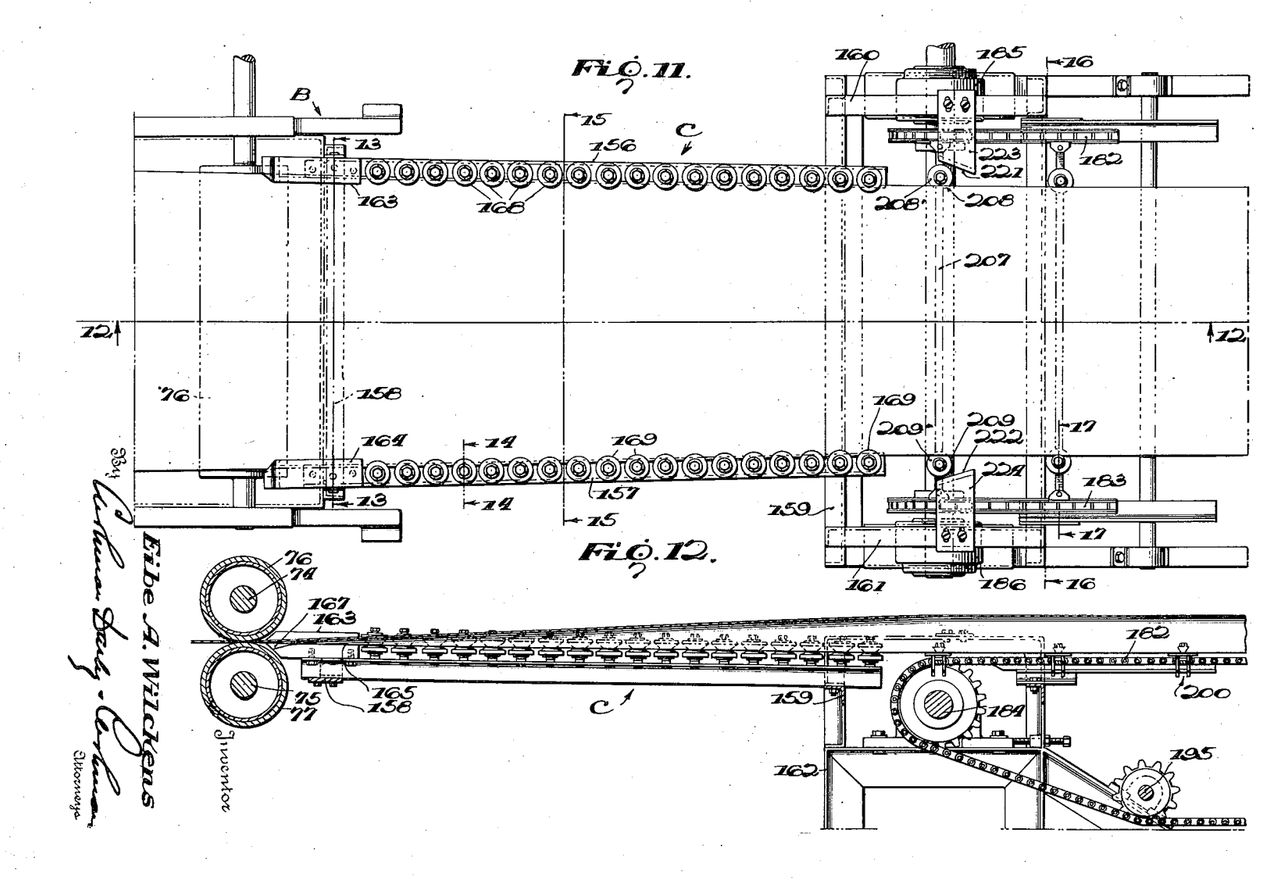
Figure 11 is a plan view of mechanism for receiving the strip from the coating mechanism and imparting a transversely bowed condition thereto.
Figure 12 is a section on line 12—12 of Figure 11.

With the parts in the relation shown in Figures 7 and 9, drive from shaft 126 will cause the applicator rolls 76 and 77 to be rotated in counterclockwise and clockwise directions, respectively, and at the same peripheral speed as the roll 59. Coating material being transferred by the supply rolls to the applicator rolls, the strip S will be coated on both sides. So long as the same color is being applied to both sides of the strip, the illustrated relationship of the applicator rolls need not be altered, but if different coatings are being applied to the top and bottom of the strip, the applicator rolls should be movable apart to prevent commingling of the coatings when there is no strip between the rolls. It is for this reason that I have provided the divergent guideways for the roll bearings and I shall now describe means whereby these bearings are displaceable along their guideways to cause substantial separation of the rolls.

Journaled in the ends of arms 86 and 87 is a rock shaft 133 which at its ends has fixed thereto manually swingable upright arms 134 and 135. Also fixed to the shaft 133 adjacent arms 134 and 135 in angular relation thereto, and preferably integral therewith, are short arms 136 and 137. Fixed to the rear edge of wall 66 is a block 138 in which is horizontally adjustable a bolt 139 which swingably supports a link 140 on a transverse horizontal axis. A stop 141 threaded in a flange 142 of block 138, Figure 10, engages a spacer collar 143 on bolt 139 in order to prevent displacement of the latter rearwardly. The other end of link 140 is pivoted by means of a bolt 144 to one end of a link 145 whose other end is pivoted at 146 to slide 92. A vertical link 147 has its lower end pivoted to links 140 and 145 through bolt 144 and its upper end pivoted by means of a bolt 148 to the extremity of arm 136.

A block 149 similar to block 138 is secured to the rear edge of wall 67 and similarly pivotally supports one end of a link 150 whose other end is pivoted by means of a bolt 151 to one end of a link 152 whose other end is pivoted at 153 to slide 102. The lower end of a vertical link 154 pivotally engages links 150 and 152 through bolt 151, the upper end of the link being pivoted at 155 to the extremity of arm 137.

Figure 8:
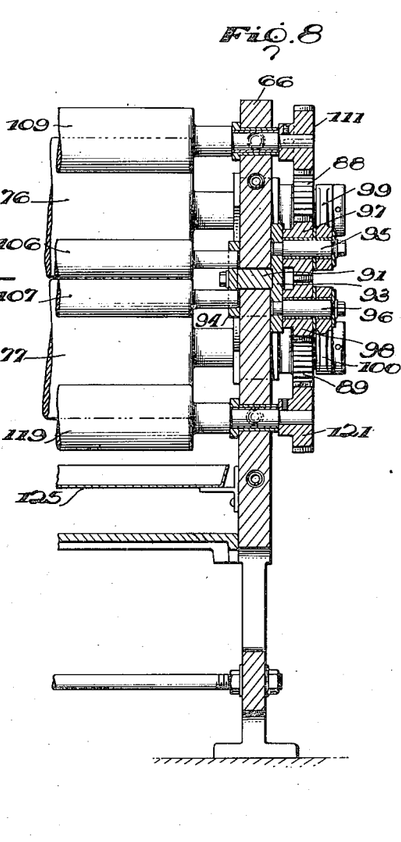
Figure 8 is a section on line 8—8 of Figure 7.

It will be evident that by rocking the shaft 133 in a clockwise direction, the toggles constituted by links 140, 145 and 150, 152, will be caused to break upwardly, thereby pulling carriages 92 and 102 to the right, Figures 7 and 8, and exerting thrust through the links as at 99 and 100 on the bearings of shafts 74 and 75 to move the shafts and applicator rolls in divergent paths so that substantial clearance is provided between the rolls, movement being limited in accordance with the setting of stops 82 and 83 which are engaged by the bearing blocks for shaft 75. Gears 111 and 121 have their axes located to the rear of the applicator roll axes and will not interfere with the displacement of gears 88 and 89, which latter, due to their engagement with the idlers 97 and 98, will immediately come into proper mesh upon the return of the slides when the toggles are again straightened. Gear 132 has prolonged mesh with its associated gear on shaft 75 due to its described disposition relative to the normal axis of the latter, and ordinarily these gears do not completely separate. The supply rolls are free-running and re-meshing of gears 88 and 89 with gears 111 and 121 will take place with no difficulty. When stops 82 and 83 are readjusted, it will be evident that shaft 133 cannot be rocked and that the applicator rolls will be rigidly maintained in adjusted operative position.

The strip forming or bowing mechanism C, Figures 3 and 11 to 15, comprises a pair of angles 156 and 157 supported at their forward ends on a bar 158 secured beneath blocks 138 and 149 of the coating mechanism and at their other ends on an angle 159 extending between upward frame extensions 160 and 161 of a frame 162. Fixed on the forward ends of the angles 156 and 157 are blocks 163 and 164 provided on their inner faces with longitudinally extending grooves or notches 165 and 166 adapted to receive the edges of a strip leaving the applicator rolls to confine the said edges. The forward ends of the grooves have flared mouths as at 167, Figure 12, so as to be sure to pick up the forward end of the strip as it leaves the applicator rolls. At the point where the section line 13—13 is taken, the edges of the strip lie in the grooves 165 and 166 in the manner shown in Figure 13.

Figures 13, 14, 15, 17:
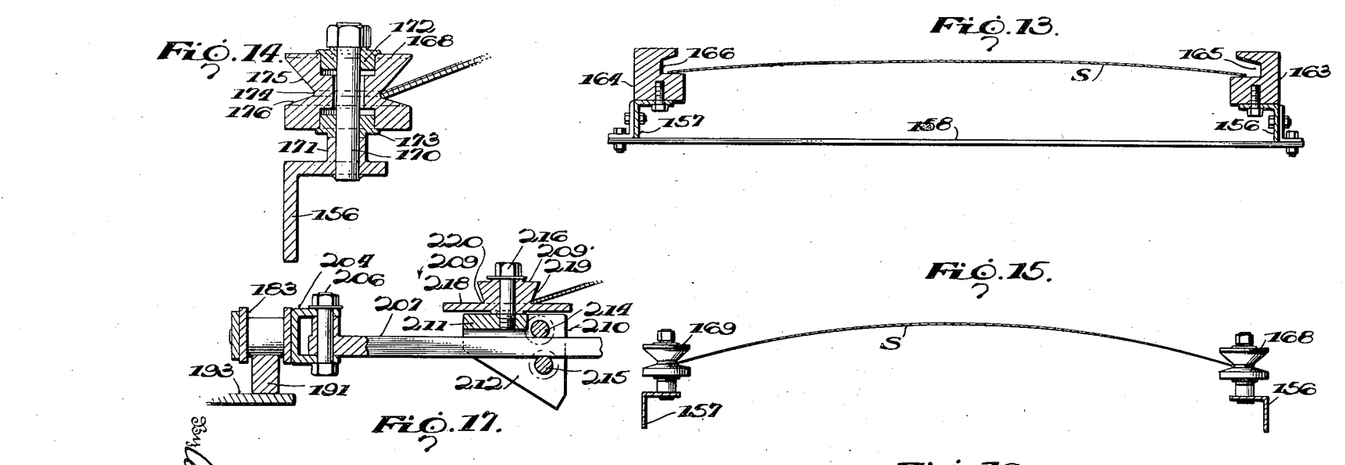
Figure 13 is a section on line 13—13 of Figure 11.
Figure 14 is a section on line 14—14 of Figure 11.
Figure 15 is a section on line 15—15 of Figure 11.
Figure 17 is a section on line 17—17 of Figure 11.

Following the blocks 163 and 164, angles 156 and 157 support series of identical rollers 168 and 169, respectively, in the manner particularly shown in Figure 14.

Referring to this figure, a stud 170 has its base portion received in a collar 171 on the top flange of the angle 156 with its lower extremity welded to the flange, the stud being perpendicular to the latter. The roller 168 is rotatable on the pin 170 through pressed-in bushings 172 and 173. The roller has a peripheral notch including a cylindrical portion 174 and conical portions 175 and 176 flared respectively upwardly and downwardly from the cylindrical portion 174, the conical portion 176 being relatively flat as compared to the conical portion 175. Any axial section of the roller shows an angular notch with a point constituted by an element of the cylindrical portion 174.

Angles 156 and 157 are somewhat rearwardly converged as are also consequently the series of rollers 168 and 169 the axes of the rollers of each series being in a common plane and the cylindrical portions as at 174 of the rollers lying in a common plane. As a consequence, when a strip is guided to the rollers by the blocks 163 and 164, whose grooves are somewhat convergent toward the adjacent rollers, a progressively increasing transverse compressive action is exerted on the end of the strip and the latter is caused to take a transversely upwardly bowed form of progressive steepness from the entering to the departing ends of the roller series. To insure upward bowing, the edge of the incoming strip may be pulled upwardly at its center while it is in the block grooves. With the strip transversely bowed, it will be evident that it can be supported entirely from its edges in the manner shown in Figures 14 and 15 so that the coating on the lower surface of the strip will be undamaged. The support of the strip edges occurs at the junction of the pressure applying portions as at 174 and the shoulders as at 176, Figure 14.

Figure 23:
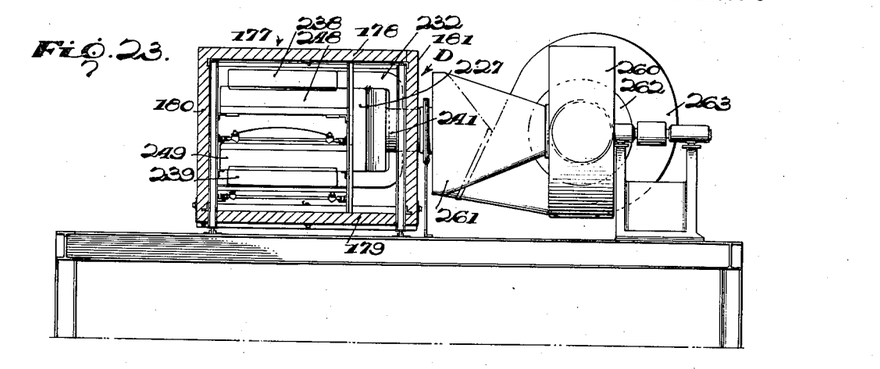
Figure 23 is a section on line 23—23 of Figure 1.
Figure 24:
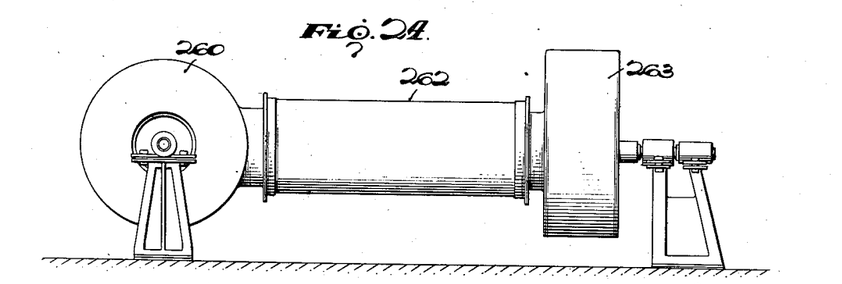
Figure 24 is a side elevation of apparatus appearing in Figure 23.
Figures 27, 28:
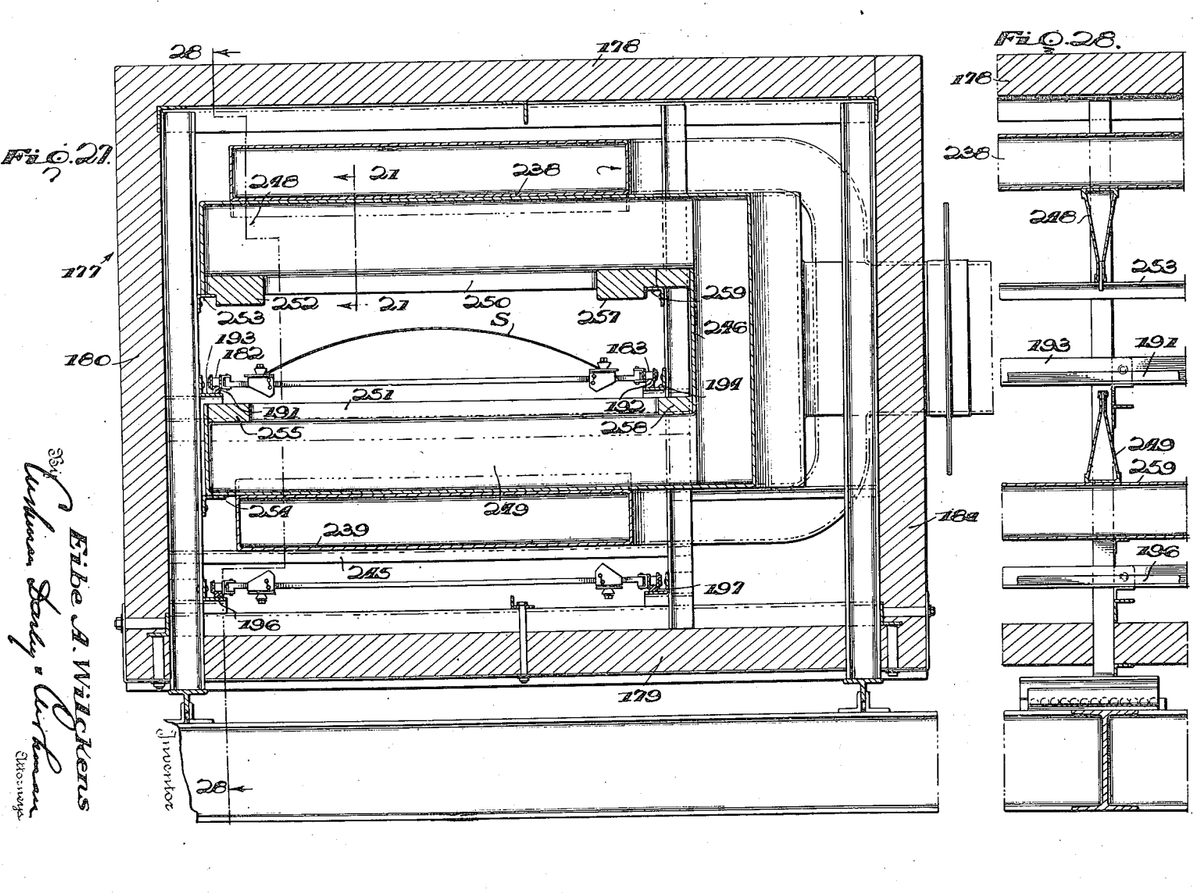
Figure 27 is a partial section like that of Figure 23 on an enlarged scale.
Figure 28 is a section on line 28—28 of Figure 27.

The oven D comprises an elongated housing 177 having insulated top, bottom and side walls, 178, 179, 180 and 181, Figures 23 and 27, of which the side wall 181 is preferably removable as indicated. The housing, as is customary, is supported in such a manner as to take care of longitudinal expansion and contraction.

Figure 3:
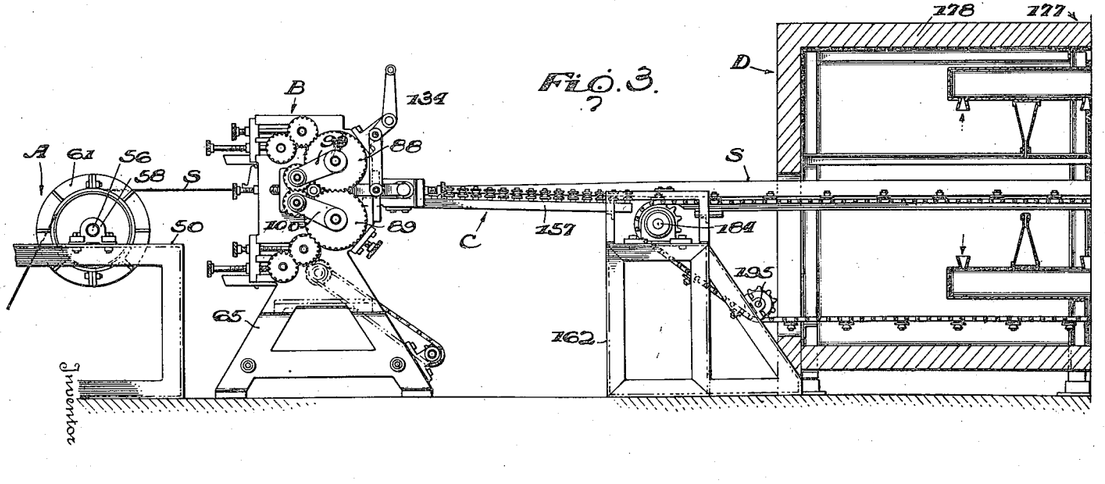
Figure 3 is an enlarged section substantially on line 3—3 of Figure 2.
Figure 4:
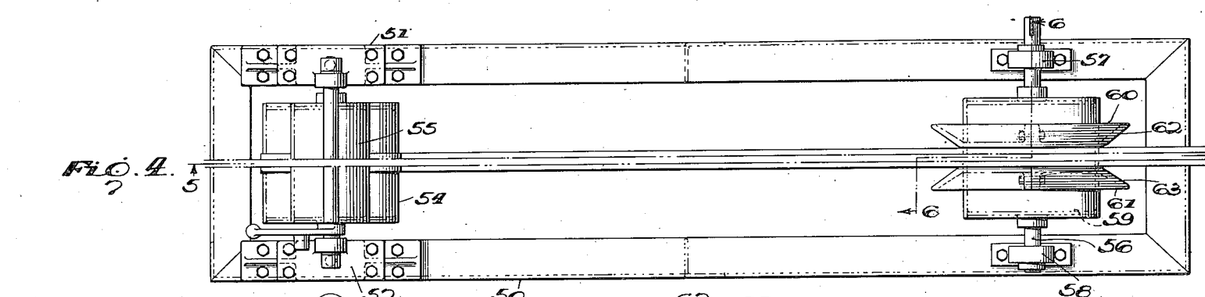
Figure 4 is a plan view, on enlarged scale, of strip handling mechanism appearing at the head end of the line in Figures 1 and 2.
Figures 5, 6:
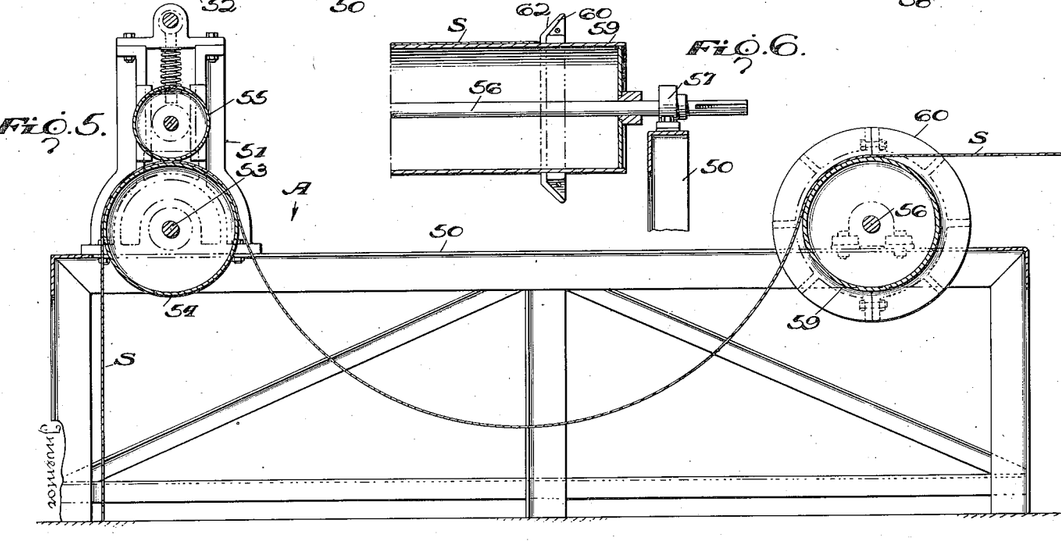
Figure 5 is a section on line 5—5 of Figure 4.
Figure 6 is a section on line 6—6 of Figure 4.

The housing is longitudinally traversed by a conveyor comprising parallel endless roller chains 182 and 183 which at their front ends engage sprockets on a head shaft 184 supported in adjustable bearings 185 and 186 on frame 162, which, as shown in Figure 3, is just in advance of the entering end of the housing 177. The rear ends of the chains engage sprockets on a foot shaft 187 supported in bearings 188 and 189 on a frame 190 just beyond the departing end of the housing. The upper runs of the chains ride on rails 191 and 192 supported on angles 193 and 194 secured to vertical members of the housing framework as shown in Figure 27. Adjacent the head shaft 184 the lower runs of the chains engage sprockets on a shaft 195 journaled on an extension of frame 162, the lower runs being supported throughout the length of the housing on rails 196 and 197, Figure 27. Adjacent the foot shaft 187, Figure 31, the chains pass over sprockets on a shaft 198 mounted on an extension of frame 190 and then downwardly under automatic compensating sprockets on a shaft 199. From the latter sprockets the lower runs extend upwardly and over sprockets on a shaft 200 supported on the extension of frame 190 and thence to the foot sprockets. While the course of the lower runs has been traced from shaft 184 to shaft 187, it will, of course, be understood that the lower runs travel from the latter toward the former. The foot shaft 187 has a sprocket engaged by an endless chain 201 driven from a motor-reducer unit 202.

Secured at intervals to opposite inner links of chains 182 and 183 are yokes 203 and 204, the free ends of whose arms are pierced to receive bolts 205 and 206 on axes normal to the plane of the chains, these pins engaging the ends of bars 207 of rectangular cross section.

Figure 16:
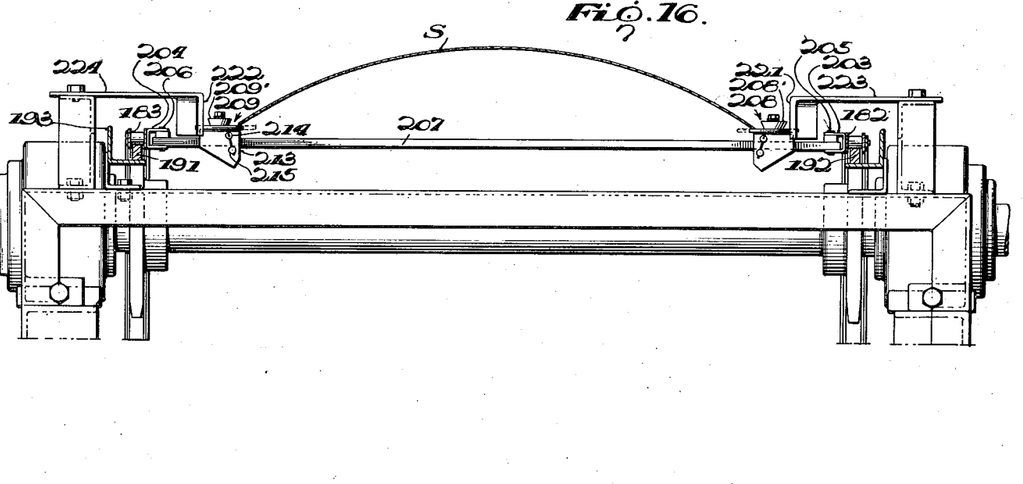
Figure 16 is a section on line 16—16 of Figure 11.

Slidable on the end portions of each bar 207 are strip edge engaging members 208 and 209 which are of identical form but in reverse positions. Referring to Figures 16 and 17, member 209 comprises a channel member 210 having a top web portion 211 and depending flanges 212 and 213 which receive bar 207 with sliding clearance so as not to be substantially tiltable transversely of the bar. The flanges are pierced to receive pins 214 and 215 above and below the bar, the ends of the pins being wired together as shown in Figure 16 to prevent their rotation. Threaded into an opening in web 211 from the top thereof and in perpendicular relation thereto is a cap screw 216 on which is rotatable a roller 209' which is peripherally notched to provide a flat radially expanded bottom flange or shoulder 218 and an upper conical portion 219 at the base of which is a circular pressure portion 220.

Figure 29:
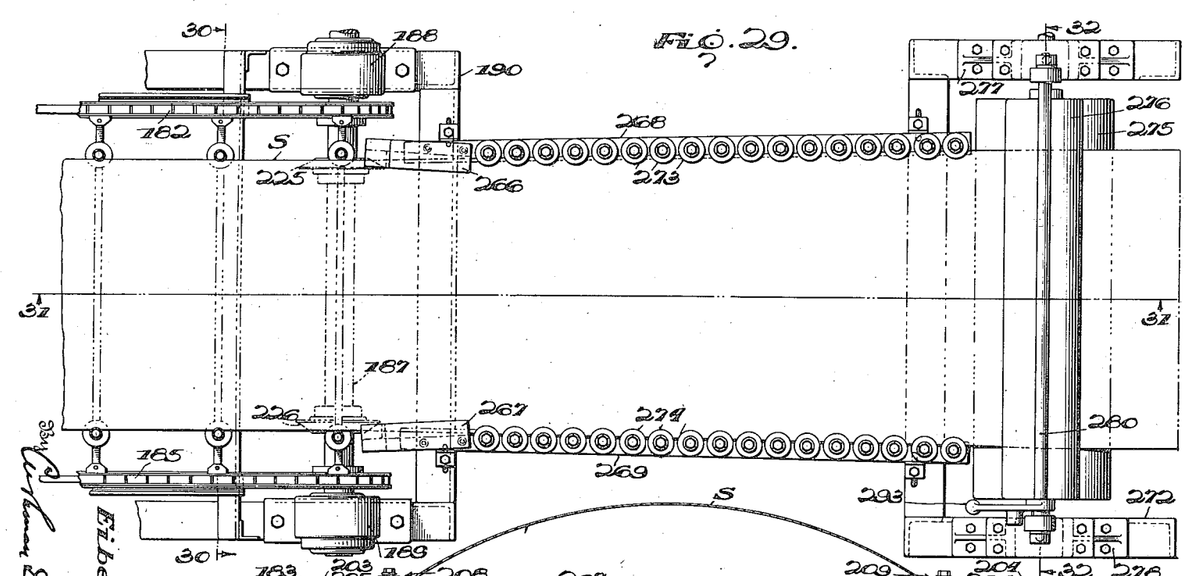
Figure 29 is a plan view of apparatus at the departing end of the oven for permitting the strip to return to flat condition.
Figure 30:
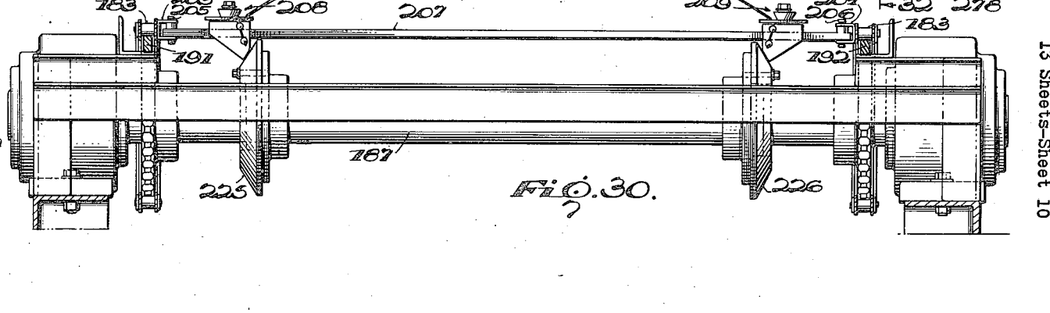
Figure 30 is a section on line 30—30 of Figure 29.

Pins 214 and 215 constitute releasable self-locking gripping members or portions. Pressure exerted on roller 209' in the direction of chain 183, causes these members to frictionally grip bar 207 so that member 209 is locked in position, as shown in Figure 17, with the roller axis substantially vertical. Pressure on roller 217 in the opposite direction will cause the release of member 209 so that is is movable freely inwardly on the bar. Similarly, outward pressure on the lower extremities of flanges 212 and 213 will release the gripping members so that member 209 is freely movable outwardly on bar 207. Members 208, of course, function in the same manner, these each including a roller 208'. As bar 207 comes up around the head sprockets, its members 208 and 209 occupy the positions shown in Figure 11, wherein they are spaced slightly further apart than the adjacent rollers 168 and 169. When rollers 208' and 209' receive the on-coming end of the bowed strip, the transverse expanding action of the strip locks members 208 and 209 on the bar 207, so that the bowed condition of the strip is substantially maintained. As the bar 207 in question continues its travel, the expanded base portions of the rollers 208' and 209' strike the rearwardly convergent faces 221 and 222 of transversely adjustable cams 223 and 224 mounted on frame extensions 160 and 161 and members 208 and 209 are moved together so that the strip is additionally bowed, members 208 and 209 immediately locking as they leave the cams. Of course, the adjustment of cams 223 and 224 will determine the desired arc of the strip which may be the same as, or greater or smaller than, the arc between the extreme right hand rollers 168 and 169. The strip is thus carried in transversely bowed condition supported entirely from its edges on the flanges as at 218 up to the foot shaft 187, which is particularly shown in Figures 29, 30, has fixed thereon conical cams 225 and 226 which are engaged by the lower extremities of members 208 and 209 so that the latter are forced apart and release edges of the strip.

During the passage of the strip through the housing 177, it is subjected to highly heated air and consequently the strip undergoes expansion, this being accommodated by the rollers 208 and 209. When the factor of expansion is not involved, the rollers can be replaced by blocks having notches such as would be shown by an axial section of a roller 208 or 209. In any event, the conveyor preferably exerts a traction effect on the strip as well as supporting it.

Figure 18:
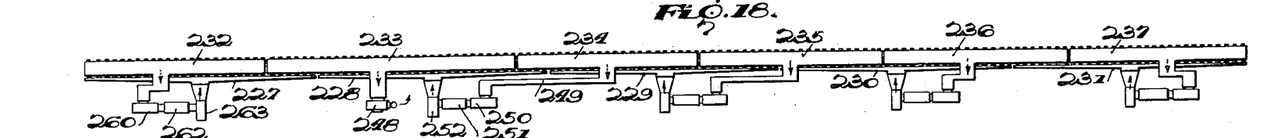
Figure 18 is a plan view of heat supplying and exhausting units for the drying oven which occupies the major portion of the line in Figures 1 and 2.
Figures 25, 26:
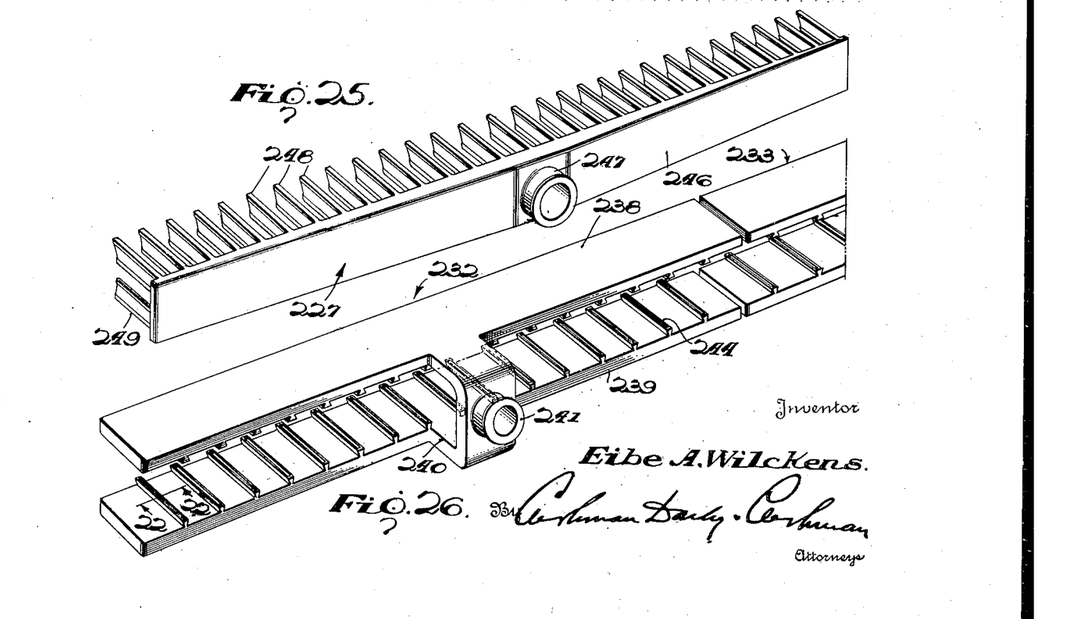
Figure 25 shows in perspective an in-put unit for the drying medium.
Figure 26 shows an exhaust unit in perspective.

Extending through the housing 227 in end to end relation are air input units 227, 228, 229, 230 and 231 and exhaust units 232, 233, 234, 235, 236 and 237, Figure 18. Units 227, 232 and a part of unit 233, are shown in Figures 25 and 26.

The exhaust unit 232 comprises upper and lower conduits 238 and 239, these being of flat rectangular section and somewhat wider than the strip S as bowed in its passage through the oven. Conduits 238 and 239 are joined centrally by a branch connection 240 having centrally of its outer face a short conduit section 241. The inner surfaces of conduits 238 and 239 are provided with transverse slots 242 and 243, Figures 20 and 22, which are rimmed by external flanges 243' and 244 whose walls longitudinally of the slots are flared away from the respective conduits. The ends of the conduits are closed. As particularly shown in Figures 23 and 27 the conduits are supported in the housing 177 respectively above and below the strip S. As shown in Figure 27 the lower wall of conduit 239 rests on transverse angles as at 245 and the upper conduit is similarly supported. Preferably the construction is such that with the housing side wall 181 removed the unit can be inserted as a whole to the position shown.

Figures 19, 20, 21, 22:
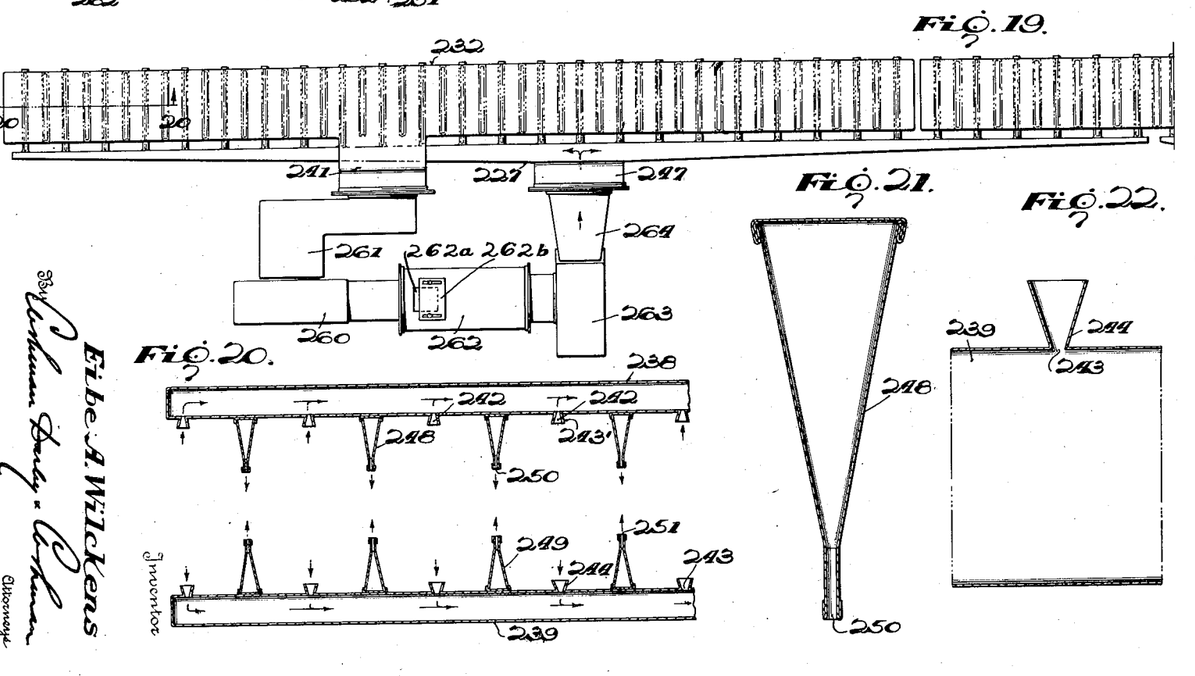
Figure 19 is an enlarged plan view of units appearing at the left in Figure 18.
Figure 20 is a section substantially on line 20—20 of Figure 19.
Figure 21 is a section on line 21—21 of Figure 27.
Figure 22 is a section on line 22—22 of Figure 25.

The input unit 227 comprises a conduit 246 which is laterally tapered from a centrally disposed short conduit section 247 toward its closed ends. On its side opposite the section 247, conduit 246 supports and is in communication with top and bottom series of hollow arms 248 and 249, the longitudinal walls of these arms being converged so that opposed restricted longitudinal slots 250 and 251 are provided. In operative relation, the arms 248 and 249, which constitute elongated nozzles, are positioned respectively just below and just above the conduits 238 and 239, as shown in Figure 20, and between the slots 242 and 243 of the exhaust unit 232. The spacing of the arms from slots 242 and 243 is preferably uniform as shown. In Figures 27 and 28 it will be seen that the outer ends of slots 250 are closed by blocks as at 252 which rest on an angle 253. The outer ends of arms 249 are supported on an angle 254 and the outer end portions of the slots 251 are closed by blocks as at 255. Upper and lower blocks 257 and 258 close the inner end portions of the slots 250 and 251, the blocks 257 resting on a supporting angle 259. The length of slots 250 and 251 between the end blocks is substantially the same as the width of the bowed strip. In preferred arrangement, the housing side wall 181 being removed, the unit 227 is inserted to position and then the unit 232 is inserted in straddling relation.

Referring particularly to Figures 18, 19, 23 and 24, the section 241 of unit 232 is in connection with a suction fan 260 through a conduit 261, the suction fan discharging into a heater 262 with controllable air intake, the heater feeding to a blower 263 which through a conduit 264 is in connection with the conduit section 247. The air intake on each heater 262 may comprise an opening 262a such as shown in Figure 19 and controlled by an adjustable sliding shutter 262b.

With the suction fan and blower in operation, air discharged from nozzles 248 and 249 strikes both sides of the strip, spreading therealong and meeting the air from the adjacent nozzles. Considerable turbulence is set up at these meeting points. As the streams of air thus meet they merge and move toward the alternated slots of the exhaust ducts through which the air is withdrawn. All of the air in contact with the strip is in constant and very rapid motion, with no dead spots of stagnant or slowly moving air, thus insuring the rapid drying of the coating.

Exhaust unit 233 is of exactly the same construction as unit 232, but is here shown as somewhat longer, and at its forward end is overlapped to some extent by the rearward end of input unit 227. Unit 233 is in connection with a suction fan 248 which discharges to the atmosphere. Input unit 228 laps that portion of unit 233 not overlapped by the input unit 227, and from Figure 18 it will be seen that the rearward portion of unit 228 overlaps to a substantial extent the forward portion of exhaust unit 234. Units 228 and 234 are exactly like units 227 and 232 and are connected together through a conduit 249, an exhaust fan 250, a heater and air intake unit 251, and a blower 252. Input unit 229 laps that portion of exhaust unit 234 not lapped by input unit 228 and overlaps the exhaust unit 235 for a distance twice that which unit 228 overlaps unit 234. Units 229 and 235 are connected together through the same suction fan, heater and air intake unit, and blower, as before. Units 230 and 236 are similarly connected together as are also units 231 and 237. Unit 230 overlaps unit 236 for a distance three times that which unit 228 overlaps unit 234. Unit 231 overlaps the remainder of unit 236 and the whole of unit 237. A staggered relation of the units of the two series thus exists throughout. To view the relation from the other end of the line, Figure 18, the input units progressively overlap succeeding exhaust units by increasing relative amounts and corresponding units of the two series are connected together.

The theory underlying the above described arrangement of input and exhaust units is that the greatest removal of impurities will occur in the zone occupied by exhaust unit 233. Hence, this zone has total spill, i. e. has a discharge which goes completely to the atmosphere, whereas all other zones re-circulate up to it. Exhaust unit 232 feeds to input unit 227 and, for example, twenty per cent of fresh air may be added at the heater and air intake unit 262. Conditions in the zone of exhaust unit 232 permit of major recirculation in that zone, some of the mixture reaching input unit 227 being passed into the zone of exhaust unit 233, due to the overlap. Going to the other end of the line, the majority of the mixture (including twenty per cent of new air added at the heater) reaching unit 231 from the zone of unit 237 is recirculated in the latter zone, although some of the mixture is passed on to the zone of exhaust unit 236. A still greater percentage reaching input unit 230 is passed on to the zone of exhaust unit 235, a still greater percentage of the mixture reaching input unit 229 is passed on to the zone of unit 234, and a still greater percentage of the mixture reaching unit 228 is passed on to the zone of exhaust unit 233, where there is total spill, as before mentioned. There is thus progressive recirculation from both ends of the oven up to the zone of total spill. Great economy in heating costs is achieved by the described arrangement and a good air condition is maintained in the various zones.

The oncoming end of the strip being released at the foot shaft 187, as previously described, it is immediately caught in the flared ends of grooves as at 265, Figure 31, in blocks 266 and 267, these blocks being fixed on the ends of angles 268 and 269 whose forward ends are supported on an upper extension 270 of frame 190 and whose rearward ends are supported on an upward extension 271 of a frame 272. These angles carry rollers 273 and 274 exactly like the rollers 168 and 169 hereinbefore described. In this case, however, the angles 268 and 269 are rearwardly divergent, and as the end of the strip passes between the two series it is permittted to return from its bowed condition to a condition of relative flatness, still supported from its edges. The grooves of blocks 266 and 267 are somewhat forwardly divergent, but catch the released end of the strip before it has materially flattened and guide it in bowed condition to the adjacent rollers.

Departing from the mechanism E, the strip passes between flattening rollers 275 and 276 journaled in pedestals 277 and 278 which are mounted on the top of frame 272, these rolls being identical with the rolls 54 and 55 at the head end of the line. Roll 275 has a shaft 279 journaled in fixed bearings of the pedestals, whereas roll 276 has a shaft 280 journaled in vertically slidable bearing blocks 281 and 282. The block 281 has pivoted thereto on an axis parallel to the shaft a pin 283 whose upper portion is slidably guided in a cap plate 284, a compression spring 285 being interposed between the cap plate and the bearing block. Similarly, block 282 has pivoted thereto a pin 286 whose upper portion is slidably guided in a cap plate 287, a compression spring being interposed between the latter and the block. Cap plates 284 and 287 include upstanding bearing portions 288 and 289 respectively and support a rock shaft 290 which at its ends has eccentric portions 291 and 292 engaged in horizontally elongated eyes at the upper ends of pins 283 and 286. Normally, roll 276 is strongly pressed toward roll 275 and against the strip by the springs. However, roll 276 may be lifted upon rocking shaft 290 through manipulation of handle 293 so that the oncoming end of the strip will pass between the rolls without further attention.

From the rolls 275 and 276 the strip may be led downwardly to a roll 294 and then looped about tension rolls 295 and 296 and led to a rewind drum on a shaft 297 driven from a speed reducer 298 as shown in Figures 38 and 39.

However, if cooling of the strip is necessary the cooling apparatus shown in Figures 1, 2 and 34 to 37 may be utilized. Referring to these figures, reference numeral 299 designates a frame including upright members flared outwardly at their upper ends and supporting a deep tank 300. The specific pressure rollers 275 and 276 and their supporting frame 272, as shown in Figures 32, 33 and 38, are dispensed with and the departing end of mechanism E is supported on the upper end of frame 299. Journaled in bearings at the upper end of frame 299 adjacent the departing end of mechanism E and with its top at the level of the departing strip, is a roll 301. Swingably supported at the upper end of pedestals 302 and 303 on the frame are bearings 304 and 305 in which are journaled the ends of a shaft 306 which carries a roll 307 which, in cooperation with roll 301, serves to insure the flatness of the strip leaving the mechanism E. Initially, roll 307 may be swung upwardly so that the strip can be inserted. A roll 308 is journaled on the upper end of frame 299 opposite roll 301 and cooperable therewith is a swingable roll 309 whose position is controllable pneumatically by a cylinder and piston 310 and 311.

Secured to the inner side faces of the tank side walls are pairs of vertical strips 312, 313 and 314, 315. Strip 312 has fixed to its outer face a rack 316 and strip 314 supports a similar rack 317. Strips 313 and 315 have rails 318 and 319 respectively secured thereto. A shaft 320 carries a depending pan or trough 321 and within the latter a roll 322. The ends of the shaft 320 have mounted thereon rollers 323 and 324 cooperating with the tracks 318 and 319 respectively. Inwardly of the rollers shaft 320 has fixed thereon gears 325 and 326 which engage the racks 316 and 317 respectively. Trough 321 has upstanding ears 327 and 328 to which are connected the ends of cables as at 329 whose other ends are wound on a drum 330 fixed on a shaft which is journaled in bearings supported by the upper extremities of strips 312 to 315. Shaft 330 is preferably reversibly motor driven.

Figure 37:
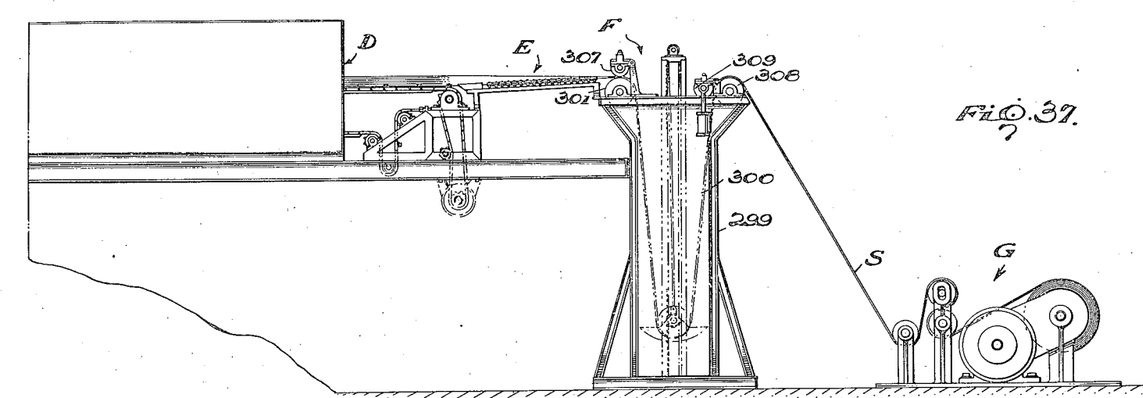
Figure 37 is a side elevation, enlarged, of the right hand end of the line of Figures 1 and 2.

From rolls 301 and 307 the strip is directed under roll 322 and through trough 321 and then between rolls 308 and 309, which are moved apart for the purpose, to the re-wind mechanism G, Figure 37, which is the same as that shown in Figures 38 and 39. The apparatus F may be utilized in the condition shown in Figure 4 and in this situation there may or may not be a cooling liquid in trough 321. If cooling of the strip is required, the cables are permitted to unwind so that roll 322 carries the strip in a loop to any desired distance down in the tank 300 which is filled with cooling liquid, this relation being shown in Figure 37. It will be seen that roll 322 will always be on a level axis due to the engagement of the gears 325 and 326 with the racks 316 and 317. Roll 309 is caused to bear against the strip so that in cooperation with the roll 308 the cooling liquid is squeezed from the strip.

Once the end of the strip has been brought to the applicator rolls of the coating mechanism, it will continue unassisted up to the rewind mechanism, except that the upward arch may have to be manually started, as heretofore mentioned. In this connection it will be noted that in Figures 34 to 37 the trough is of such shape as to guide the strip end under roll 322 and over roll 308 where it can be caught by the attendant and carried through the rewind mechanism. To give the attendant time for this operation, roll 322 may be simultaneously lowered, thus acting as a take-up device.

Subject matter disclosed but not claimed herein may be claimed in my application for Methods and apparatus for handling and treating strip material, Serial No. 595,610, filed May 24, 1945.

It will be understood that the invention is by no means limited to the form and arrangement of parts specifically disclosed herein, being susceptible of wide variation in these respects. Furthermore, in speaking of strip material herein I do not intend to confine myself to roll-wound continuous strip, since obviously much of the apparatus could equally well handle lengths in the nature of sheets. It will also be obvious that the zone arrangement of the oven may be advantageously utilized regardless of the nature of the product to be dried.

I claim:

1. Apparatus of the class described comprising parallel series of rollers mounted on generally parallel axes and each of the rollers having an annular shoulder and a surmounting circular portion, the edges of a flexible strip being supportable on the shoulders of said opposite rollers and against the circular portions of the latter, means for successively moving the rollers of one series into a line closer to the rollers of the other series so as to engage the strip edges, means for holding the displaced rollers in displaced position, and means for successively returning the displaced rollers.

2. Apparatus of the class described comprising two oppositely disposed series of rollers mounted on generally parallel axes and each of the rollers having an annular shoulder and a surmounting circular portion, the two series being convergently arranged, and means for feeding a flexible strip between said series with it edges against the circular portions of opposite rollers and supported on the shoulders thereof, the feed being in the direction of convergence of the two series and the spacing of the latter being such that the strip is brought from a transversely flat condition to a transversely bowed condition.

3. Apparatus for handling a flexible strip comprising a conveyor having parallel runs, parallel bars connecting the runs, a pair of engaging members for the strip edges movable on each of said bars longitudinally of the latter, gripping means between said engaging members and bars, means at the head end of the conveyor for displacing the engaging members toward each other along said bars and into supporting engagement with the strip edges, the gripping means being then effective to hold the engaging members in displaced position, and means at the foot end of the conveyor for releasing the gripping means and returning said engaging members.

4. Apparatus according to claim 3 wherein the engaged strip is in transversely bowed condition and exerts a consequent pressure on said engaging members and thereby renders said gripping means operative.

5. Apparatus according to claim 3 wherein the gripping means of each engaging member is constituted by portions on opposite sides of the associated bar and wherein the engaged strip is in transversely bowed condition and exerts a consequent pressure on the engaging members thereby causing said portions to grip the associated bar.

6. Strip drying apparatus comprising an oven, means for supporting a strip in the oven, a conduit extending lengthwise of a face of a strip supported in the oven, hollow arms extending transversely of said strip between the latter and said conduit, another conduit at one side of said strip connecting said arms, said arms having openings directed toward said face and the first conduit having openings intermediate said arms directed toward said face, and means for applying suction to the first conduit and supplying a drying medium to said other conduit.

7. Apparatus according to claim 6 wherein said arms and the conduit to which they are connected constitute a unit independently insertable to position in the oven.

8. Strip drying apparatus comprising an oven, means for supporting a strip in the oven with both faces exposed, a pair of conduits of which one extends along one face of a strip in the oven and the other extends along the other face, said conduits each having slots faced toward and extending transversely of the strip, two series of hollow arms extending transversely of said strip, one of said series being disposed between one face of the strip and the conduit on that side of the strip and the other of said series being disposed between the other face of the strip and the other conduit, said arms having longitudinally extending slots faced toward the strip and the arms of each series being disposed so that they alternate with the slots of the adjacent conduit, a conduit in connection with said arms, and means for supplying a drying medium to the last named conduit and for applying suction to said pair of conduits.

9. Apparatus according to claim 8 wherein a connection is provided between the conduits of said pair of conduits so that a unit is constituted which is independently insertable in the oven.

10. Apparatus according to claim 8 wherein the two series of arms and the conduit to which they are connected constitute a unit which is independently insertable in the oven.

11. Apparatus of the class described comprising an oven, a series of exhaust conduits in end to end relation lengthwise of the oven, a series of input conduits in end to end relation lengthwise of the oven, the conduits of each series being in overlapping relation to the conduits of the other, the input conduits being longer than the exhaust conduits so that they increasingly overlap the exhaust conduits progressing from one end of the oven, and a connection between each exhaust conduit and the input conduit which is correspondingly positioned in the series.

12. Apparatus of the class described comprising an oven, a series of exhaust conduits in end to end relation lengthwise of the oven, a series of input conduits in end to end relation lengthwise of the oven, the conduits of each series being in overlapping relation to the conduits of the other, the input conduits being longer than the exhaust conduits so that they increasingly overlap the exhaust conduits progressing from one end of the oven, a connection between each exhaust conduit and the input conduit which is correspondingly positioned in the series, another exhaust conduit which is overlapped in major part by the last one of the series of such input conduits, and a discharge to atmosphere for said other conduit.

13. Apparatus according to claim 12 wherein a further exhaust conduit is provided beyond said other exhaust conduit, wherein a further input conduit laps said further exhaust conduit entirely and in part said other exhaust conduit, and wherein a connection is provided between said further exhaust and input conduits.

14. Apparatus of the class described comprising an oven, means for moving material through the oven, a series of exhaust conduits in end to end relation lengthwise of the oven, a series of input conduits in end to end relation lengthwise of the oven, the conduits of each series being in overlapping relation to the conduits of the other, the input conduit at the entering end of the oven completely lapping the exhaust conduit at the same end and in part the succeeding exhaust conduit, a connection between the input and exhaust conduits at said entering end, a discharge to atmosphere for said succeeding exhaust conduit, the succeeding input conduit lapping said succeeding exhaust conduit in major part and the next succeeding exhaust conduit in minor part and having a connection with the latter, each input conduit thereafter increasingly overlapping each exhaust conduit up to the departing end of the oven, and connections between corresponding ones of said last mentioned input and exhaust conduits, the arrangement being such that there is progressive recirculation from each end of the oven up to the said succeeding exhaust conduit.

15. In the treatment of continuous flexible strip material, the method which comprises feeding the strip lengthwise in substantially flat condition, continuously coating the strip on both sides during feed, and directly receiving the coated strip and bowing it by applying pressure to opposite edges thereof and maintaining the pressure so that the strip is supported from said opposite edges without face contact after coating until dry.

16. Apparatus of the class described comprising an oven, a series of exhaust conduits in end to end relation lengthwise of the oven, a series of input conduits in end to end relation lengthwise of the oven, the conduits of each series being in overlapping relation to the conduits of the other, the input conduits being longer than the exhaust conduits so that they increasingly overlap the exhaust conduits progressing from one end of the oven, a connection between each exhaust conduit and the input conduit which is correspondingly positioned in the series, and an inlet in each connection for fresh air.

17. Apparatus of the class described comprising an oven, means for moving material through the oven, a series of air exhaust conduits in end to end relation lengthwise of the oven, a series of air input conduits in end to end relation lengthwise of the oven, the conduits of each series being in overlapping relation to the conduits of the other, a connection between each exhaust conduit and the input conduit which is correspondingly positioned in the series, a blower in each connection, an inlet for fresh air in each connection, the overlapping of the conduits of one series with respect to the conduits of the other series being sufficient that a portion of the air moving into the oven through an input conduit will move out of the oven through an opposed exhaust conduit from which air moves to the blower connected to the next adjacent input conduit, whereby air gradually moves lengthwise of the oven, and means to flow air from one exhaust conduit to atmosphere.

18. Strip drying apparatus comprising an elongated oven, means for supporting and moving a strip in the oven in lengthwise-extending relation, means defining a series of elongated air exhaust zones in end to end relation lengthwise of the oven, means defining a series of elongated air input zones in end to end relation lengthwise of the oven, said input zones each extending along an exhaust zone which is correspondingly positioned in the series and each overlapping the next adjacent exhaust zone toward one end of the series of exhaust zones, a connection between each exhaust zone and the input zone which are correspondingly positioned in the series, a blower in said connection, an inlet in each connection for fresh air, the overlapping of the zones of one series with respect to the zones of the other series being sufficient that a portion of the air moving into the oven through an input zone will move out of the oven through an opposed exhaust zone from which air moves to the blower connected to the next adjacent input zone, whereby air gradually moves lengthwise of the oven, and means to flow air from one exhaust zone to atmosphere.

EIBE A. WILCKENS.